(12) United States Patent
Curnyn et al.

(10) Patent No.: US 9,623,717 B1
(45) Date of Patent: Apr. 18, 2017

(54) WORK VEHICLES WITH CYLINDER CUSHIONING ARRANGEMENT

(71) Applicant: Deere & Company, Moline, IL (US)

(72) Inventors: William P. Curnyn, Geneseo, IL (US); Henry C. Olsen, Bettendorf, IA (US); Michael D. Somers, Dubuque, IA (US); Francois F. Stander, Dubuque, IA (US)

(73) Assignee: Deere & Company, Moline, IL (US)

( * ) Notice: Subject to any disclaimer, the term of this patent is extended or adjusted under 35 U.S.C. 154(b) by 30 days.

(21) Appl. No.: 14/881,734

(22) Filed: Oct. 13, 2015

(51) Int. Cl.
*B62D 12/00* (2006.01)
*B62D 13/02* (2006.01)
*B60G 17/04* (2006.01)
*A01B 59/041* (2006.01)
*B60G 11/26* (2006.01)

(52) U.S. Cl.
CPC .......... *B60G 17/04* (2013.01); *A01B 59/0415* (2013.01); *B60G 11/265* (2013.01); *B60G 2800/24* (2013.01)

(58) Field of Classification Search
CPC .... B60G 17/04; B60G 11/265; A01B 59/0415
USPC ......................................................... 180/235
See application file for complete search history.

(56) References Cited

U.S. PATENT DOCUMENTS

| | | | | |
|---|---|---|---|---|
| 4,310,061 | A * | 1/1982 | Khanna .................. | B62D 12/00 180/418 |
| 4,381,827 | A * | 5/1983 | Blackmore ............ | B62D 53/02 180/235 |
| 4,386,555 | A * | 6/1983 | Horiuchi ............... | F15B 15/222 91/20 |
| 5,269,389 | A * | 12/1993 | Tomiyoshi ............. | B62D 12/00 180/235 |
| 6,460,643 | B1 * | 10/2002 | Degelman .......... | B62D 49/0607 180/235 |
| 2008/0116000 | A1 * | 5/2008 | Huang ................... | B62D 6/002 180/418 |

\* cited by examiner

*Primary Examiner* — Tony Winner

(57) ABSTRACT

A work vehicle with the cylinder cushioning arrangement includes two frame members coupled together with two hydraulic cylinders that are cross-coupled to each other. Each of the two hydraulic cylinders includes a flow-restricted port (at either its rod end or the cylinder end) that throttles hydraulic fluid flow.

11 Claims, 5 Drawing Sheets

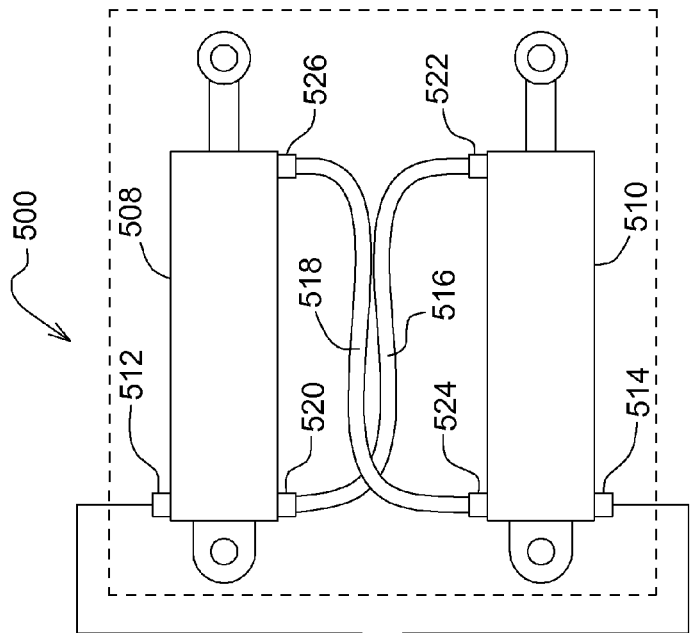
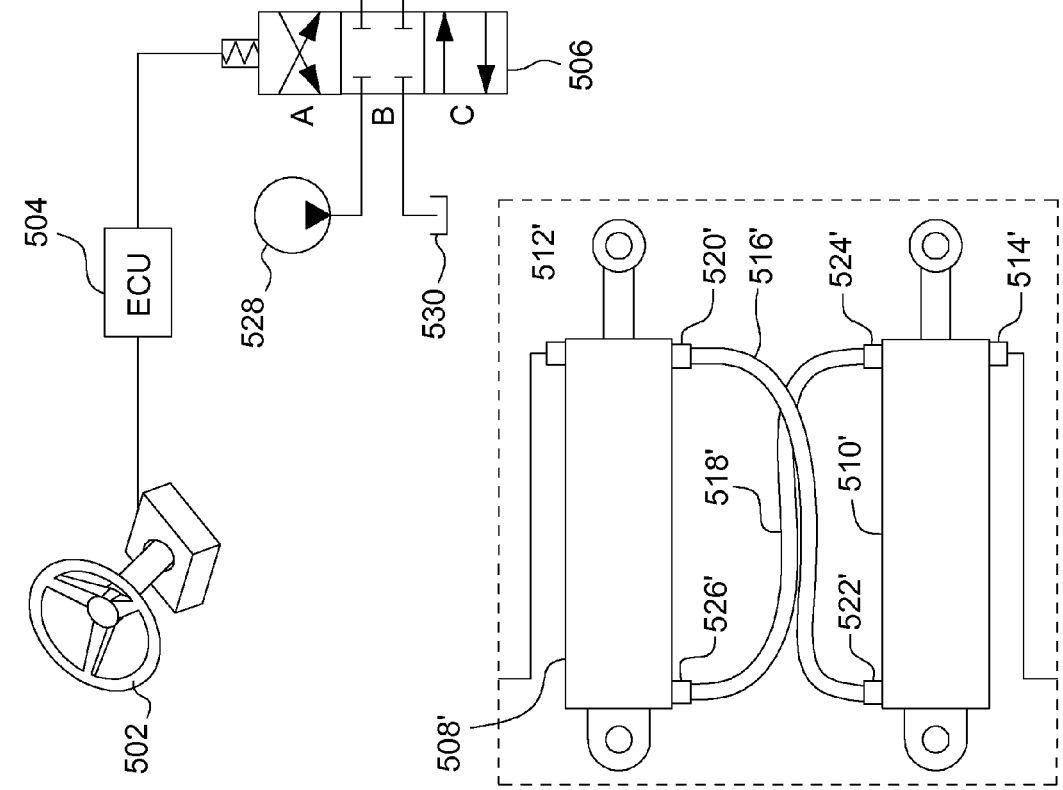
FIG. 5A
FIG. 5B

WORK VEHICLES WITH CYLINDER CUSHIONING ARRANGEMENT

FIELD OF THE INVENTION

This invention relates to work vehicles such as construction or agricultural vehicles. More particularly, it relates to work vehicles having articulated steering or swinging joints. Even more particularly, it relates to work vehicles with articulated steering or swinging joints that have hydraulic cylinder cushioning means to cushion the steering or swinging.

BACKGROUND OF THE INVENTION

Many vehicles use steering or swing joints that employ two hydraulic cylinders disposed to steer or swing by moving in opposite directions. For example, one cylinder will extend while the other cylinder retracts, and the two cylinders acting together in opposite directions will together affect the desired steering or swinging.

One cylinder will affect the steering or swinging by pushing two members apart. The other cylinder will contribute to the same steering or swinging by pulling the two members together.

In these vehicles, the swinging and steering is typically limited to a restricted range of motion such as 90° to 180°. To prevent the swinging and steering from damaging the vehicles, mechanical stops are typically provided on the two members to prevent over-swinging or oversteering that would otherwise damage the vehicle.

One problem with this arrangement is that the impact of the mechanical stops banging together can damage the vehicle.

This problem has been somewhat ameliorated by reducing hydraulic fluid flow to the cylinders to slow the swinging and steering down. As the two members being swung/steered with respect to each other approach their mechanical stops, the pressure in the hydraulic cylinders is increased to decelerate and/or stop the swinging/steering before the stops collide.

One problem with this arrangement is that a position sensor must be provided to sense the approaching collision of stops and to signal an ECU to close the valves and slow and/or stop the swinging/steering.

This problem has been somewhat ameliorated by using hydraulic cylinders that have internal dampers. These dampers are built into the structure of the hydraulic cylinder and automatically throttle the hydraulic fluid flow, thereby generating high pressures in the cylinders that damps the swinging/steering as the cylinders approach their end-of-stroke.

One problem with these arrangements is a difficulty in keeping multiple cylinders with internal dampers synchronized. As the cylinders wear or come out of adjustment, the damping load can be shifted to one of the cylinders, thereby damaging it.

What is needed is an efficient, effective and cost-effective way to absorb the energy of swinging and steering and thus reduce or eliminate damage.

SUMMARY OF THE INVENTION

In accordance with a first aspect of the invention, a work vehicle with a cylinder cushioning arrangement is provided, comprising:
a first vehicle frame member;
a second vehicle frame member pivotally coupled to the first vehicle frame member at a pivot joint wherein the pivot joint defines an axis of pivot; a first hydraulic cylinder coupled to and between the first vehicle frame member and the second vehicle frame member, the first hydraulic cylinder having an unrestricted cylinder end port, an unrestricted rod end port, and either a restricted rod end port or a restricted cylinder end port;
a second hydraulic cylinder coupled to and between the first vehicle frame member and the second vehicle frame member, the second hydraulic cylinder having an unrestricted cylinder end port, and unrestricted rod end port and either a restricted rod end port or a restricted cylinder end port;
a first conduit hydraulically coupling the unrestricted rod end port of the first hydraulic cylinder to the unrestricted cylinder end port of the second hydraulic cylinder; and
a second conduit hydraulically coupling the unrestricted cylinder end port of the first hydraulic cylinder to the unrestricted rod end port of the second hydraulic cylinder.

The work vehicle may further comprise a hydraulic valve coupled to the restricted rod end port or the restricted cylinder end port of the first hydraulic cylinder, and also coupled to the restricted rod end port or the restricted cylinder end port of the second hydraulic cylinder, wherein the hydraulic valve is controllable to introduce hydraulic fluid into the first hydraulic cylinder and into the second hydraulic cylinder, and to remove hydraulic fluid from the first hydraulic cylinder and the second hydraulic cylinder, to thereby move the first hydraulic cylinder and the second hydraulic cylinder, and to thereby pivot the first vehicle frame member with respect to the second vehicle frame member.

The first hydraulic cylinder may further comprise a first internal damper that restricts flow through the restricted rod end port or the restricted cylinder end port of the first hydraulic cylinder; and wherein the second hydraulic cylinder further comprises a second internal damper that restricts flow through the restricted rod end port or the restricted cylinder end port of the second hydraulic cylinder.

The first internal damper and the second internal damper may be configured to respectively restrict flow of hydraulic fluid exiting the first hydraulic cylinder and the second hydraulic cylinder.

The first internal damper and the second internal damper may be configured to not restrict flow of hydraulic fluid entering the first hydraulic cylinder and the second hydraulic cylinder, respectively.

The first internal damper and the second internal damper may be configured to limit the outflow of hydraulic fluid from the first hydraulic cylinder and the second hydraulic cylinder only near the limit of travel of the first hydraulic cylinder and the second hydraulic cylinder to thereby collectively cushion the first hydraulic cylinder and the second hydraulic cylinder at their limits of travel.

The first internal damper may cushion both the first hydraulic cylinder and the second hydraulic cylinder at a first limit of pivoting movement of the first vehicle frame member with respect to the second vehicle frame member in a first relative pivoting direction, and wherein the second internal damper cushions both the first hydraulic cylinder and the second hydraulic cylinder at a second limit of pivoting movement of the first vehicle frame member with respect to the second vehicle frame member in a second relative pivoting direction, wherein the second relative pivoting direction is a direction opposite to the first relative pivoting direction.

The first internal damper of the first hydraulic cylinder may cushion the second hydraulic cylinder by restricting hydraulic fluid flow out of one of the unrestricted cylinder end port, and the unrestricted rod end port.

The internal damper of the first hydraulic cylinder, and the internal damper of the second hydraulic cylinder may comprise a rod extending from a piston and an aperture formed in a cylinder head of the first hydraulic cylinder, wherein the rod is received inside the aperture to restrict hydraulic fluid flow out of the restricted cylinder end port of the first hydraulic cylinder.

The internal damper of the first hydraulic cylinder may comprise a tapered ring extending about a piston rod of the first hydraulic cylinder and an annular aperture formed in a rod end of the first hydraulic cylinder.

The internal damper of the second hydraulic cylinder may comprise a tapered ring extending about a piston rod of the second hydraulic cylinder and an annular aperture formed in a rod end of the second hydraulic cylinder.

BRIEF DESCRIPTION OF THE DRAWINGS

FIGS. 5A-5B are schematic views of two embodiments for interconnecting and steering/swinging the hydraulic cylinders shown in FIGS. 3-4 in accordance with the present invention.

DETAILED DESCRIPTION OF THE DRAWINGS

Figure 1:
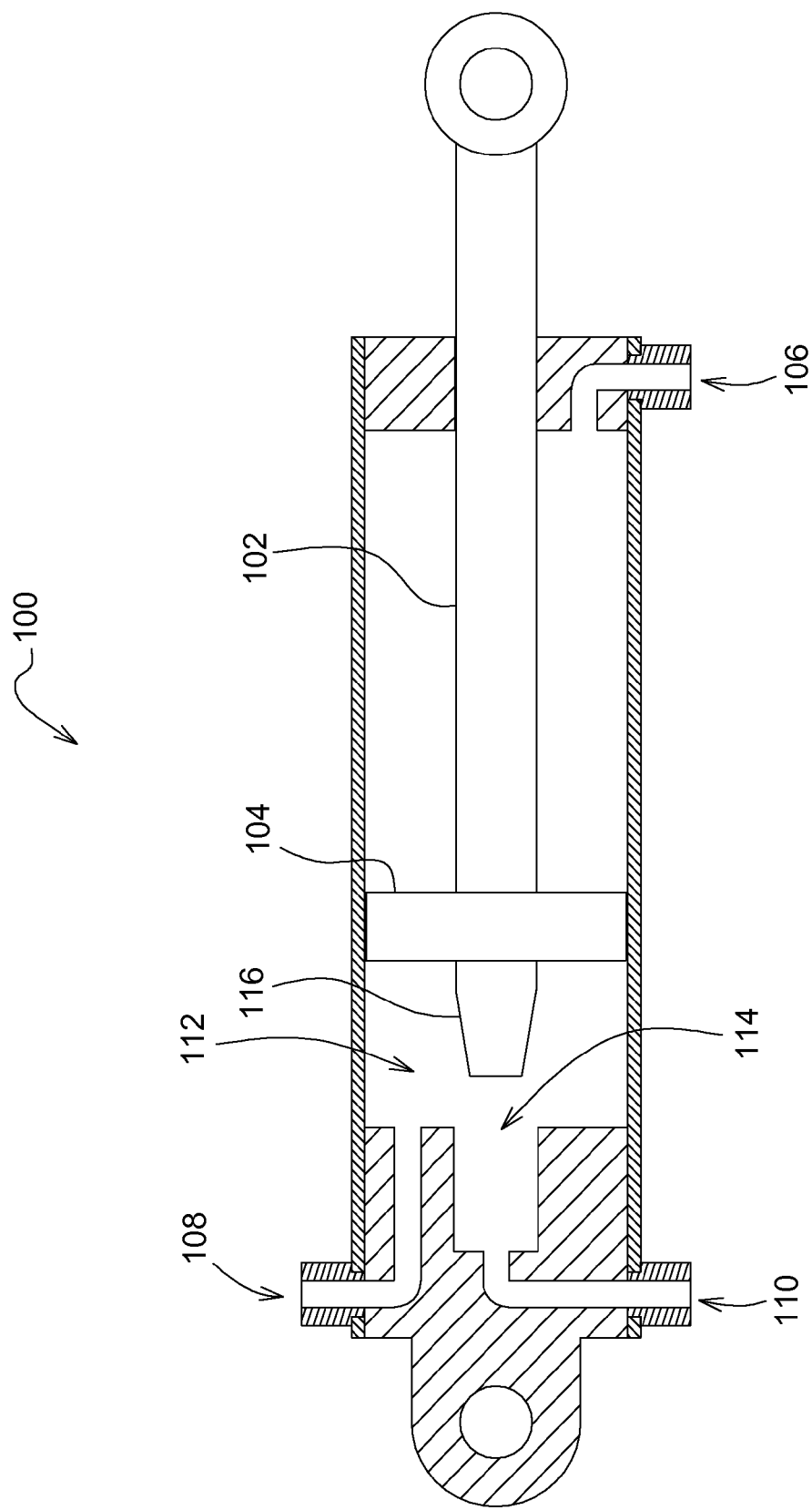
FIG. 1 is a partial cutaway view of a hydraulic cylinder with an internal damper disposed at the cylinder end of the hydraulic cylinder.

Referring to FIG. 1, a hydraulic cylinder 100 comprises a piston rod 102, a piston 104 mounted on the piston rod 102, a rod end port 106 formed in the rod end of the hydraulic cylinder 100, a cylinder end port 108 and a throttled cylinder end port 110 formed in the cylinder end of the hydraulic cylinder 100, and an internal damper 112 that throttles hydraulic fluid flow through the throttled cylinder end port 110.

The internal damper 112 comprises an aperture 114 formed in the cylinder end of the hydraulic cylinder 100, and a rod 116 supported on the end of the piston 104.

As the piston 104 moves to the left in FIG. 1, hydraulic fluid flows out of the cylinder end port 108 and the throttled cylinder end port 110. Likewise, hydraulic fluid flows into the rod end port 106. When the piston 104 moves to the right in FIG. 1, the hydraulic fluid flows are reversed.

Eventually, as the piston moves to the left in FIG. 1, the rod 116 will be inserted into the aperture 114, and will begin to throttle hydraulic fluid flow out of the throttled cylinder end port 110. In the embodiment shown in FIG. 1, this throttling is gradual and a function of the piston position, since the rod 116 has a tapered conical section that gradually blocks off the aperture 114 more and more as more of the rod 116 is received in the aperture 114. Over substantially all the stroke of the hydraulic cylinder 100, the internal damper 112 does not restrict the flow of hydraulic fluid out of the hydraulic cylinder 100. Only as the hydraulic cylinder 100 approaches the end of its working retraction stroke does the internal damper 112 function.

The other ports on the hydraulic cylinder 100 are not restricted and thus hydraulic fluid flow into and out of the other ports is not throttled.

Figure 2:
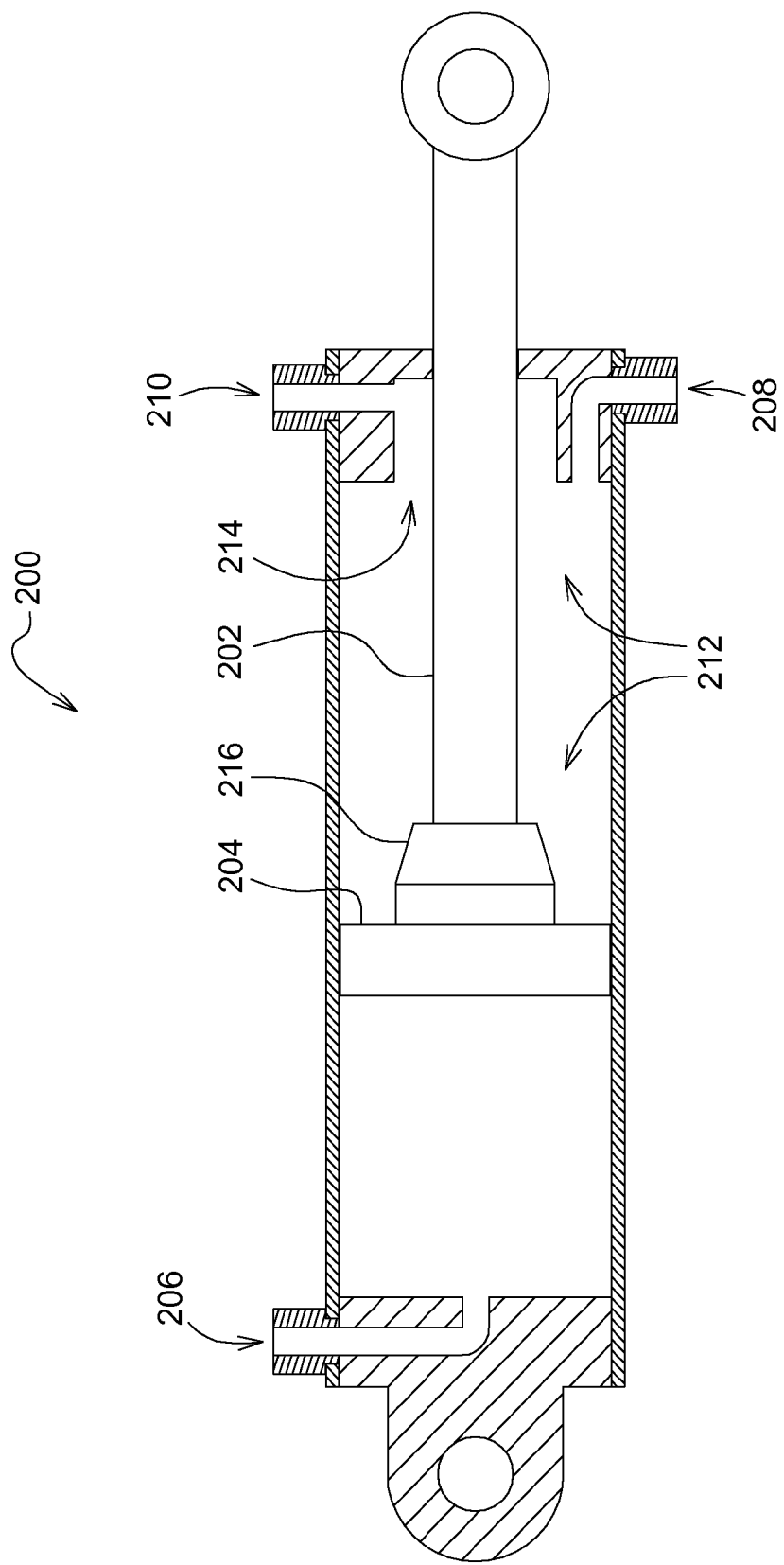
FIG. 2 is a partial cutaway view of a hydraulic cylinder with an internal damper disposed at the rod end of the hydraulic cylinder.

Referring to FIG. 2, a hydraulic cylinder 200 comprises a piston rod 202, a piston 204 mounted on the piston rod 202, a cylinder end port 206 formed in the cylinder end of the hydraulic cylinder 100, a rod end port 208 and a throttled rod end port 210 formed in the rod end of the cylinder 100, and an internal damper 212 that throttles hydraulic fluid flow through the throttled rod end port 210.

The internal damper 212 comprises an annular aperture 214 formed in the rod end of the hydraulic cylinder 200, and a tapered ring 216 disposed about the circumference of the piston rod 202.

As the piston 204 moves to the right in FIG. 2, hydraulic fluid flows out of the rod end port 208 and the throttled rod end port 210. Likewise, hydraulic fluid flows into the cylinder end port 206. When the piston 204 moves to the left in FIG. 2, the hydraulic fluid flows are reversed.

Eventually, as the piston moves to the right in FIG. 2, the tapered ring 216 will be inserted into the annular aperture 214, and will begin to throttle hydraulic fluid flow out of the throttled rod end port 210. In the embodiment shown in FIG. 1, this throttling is gradual and a function of the piston position, since the rod 216 has a tapered conical section that increasingly blocks off the annular aperture 214 as more and more of the tapered ring 216 is received in the annular aperture 214.

Over substantially all the stroke of the hydraulic cylinder 200, the internal damper 212 does not restrict the flow of hydraulic fluid out of the hydraulic cylinder 200. Only as the hydraulic cylinder 200 approaches the end of its working extension stroke does the internal damper 212 function.

The other ports on the hydraulic cylinder 200 are not restricted and thus flow into and out of the other ports is not throttled.

Figure 3:
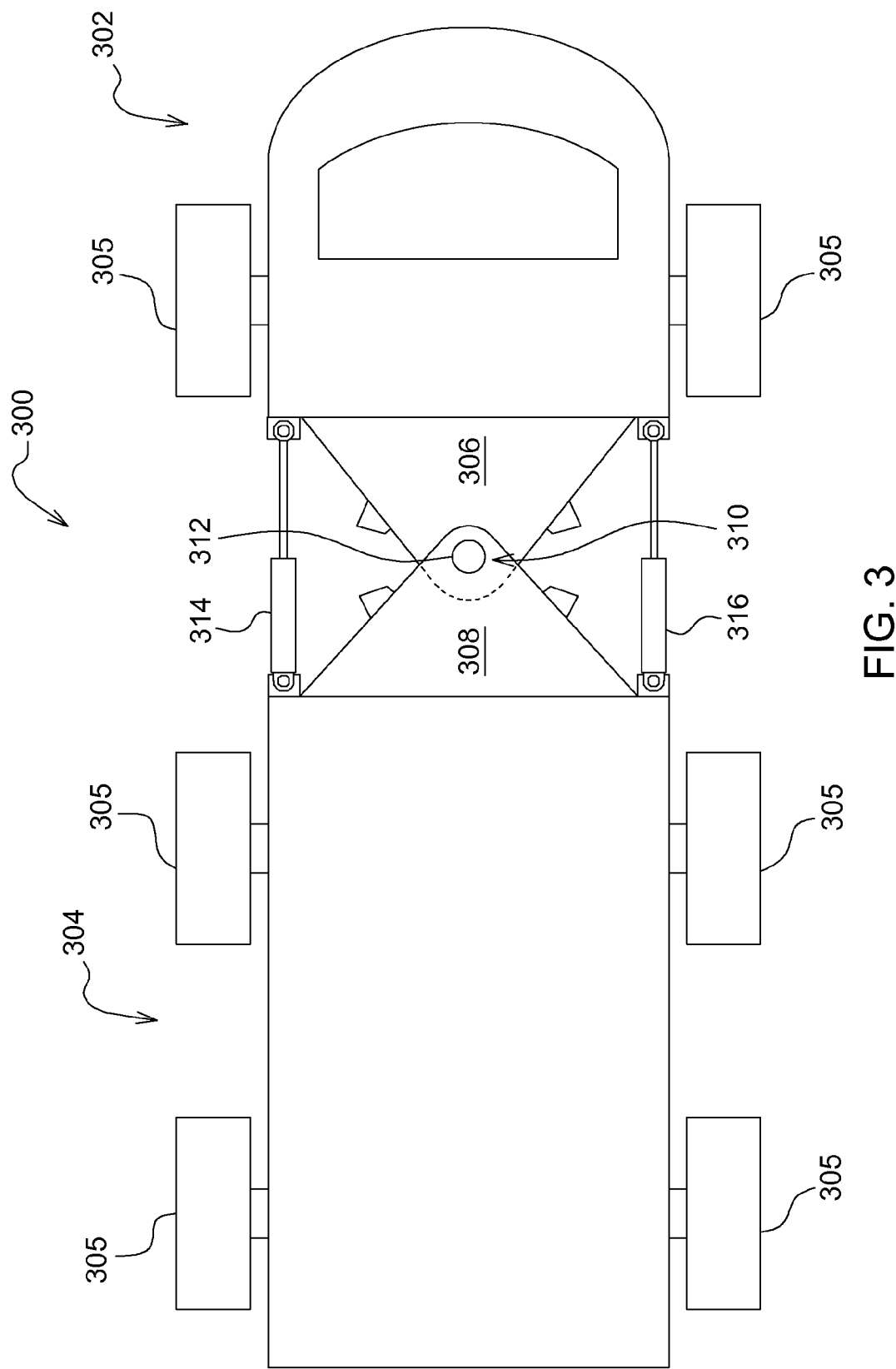
FIG. 3 is a plan view of an articulated vehicle (a truck) using opposed hydraulic cylinders to steer the vehicle.

Referring to FIG. 3, an articulated truck 300 comprises a cabin portion 302 pivotally coupled to a trailer portion 304. The cabin portion 302 and the trailer portion 304 are supported on wheels 305 for travel over the ground.

A first frame member 306 is formed integral with the cabin portion 302. The second frame member 308 is formed integral with the trailer portion 304. The cabin portion 302 and the trailer portion 304 are coupled together to form the articulated truck by a pivot joint 310 formed by a vertical pin 312 inserted into apertures in the first frame member 306 and the second frame member 308.

A first hydraulic cylinder 314 is coupled at its rod end to the left side of the cabin portion 302, and is coupled at its cylinder end to the left side of the trailer portion 304. A second hydraulic cylinder 316 is coupled at its rod end to the right side of the cabin portion 302 and is coupled at its cylinder end to the right side of the trailer portion 304.

In order to steer the articulated truck 300 to the left, the first hydraulic cylinder 314 is retracted, and the second hydraulic cylinder 316 is extended. In order to steer the articulated truck 300 to the right, the first hydraulic cylinder 314 is extended, and the second hydraulic cylinder 316 is retracted.

Mechanical stops 318 on the first frame member 306 and the second frame member 308 are provided to prevent oversteering to the left by abutting each other when the articulated truck 300 reaches its extreme leftmost steering position. Mechanical stops 320 on the first frame member 306 and the second frame member 308 are provided to prevent oversteering to the right by abutting each other when the articulated truck 300 reaches its extreme rightmost steering position.

The first hydraulic cylinder 314 and the second hydraulic cylinder 316 pivot the first frame member 306 and the second frame member 308 with respect to each other by moving in opposite directions, which means herein that the cylinders are coupled to the frame members such that one cylinder extends as the other cylinder simultaneously retracts in order to pivot the members in a first direction relative to each other, and one cylinder retracts as the other cylinder simultaneously extends to pivot the members in a second direction relative to each other that is opposite to the first direction.

Figure 4:
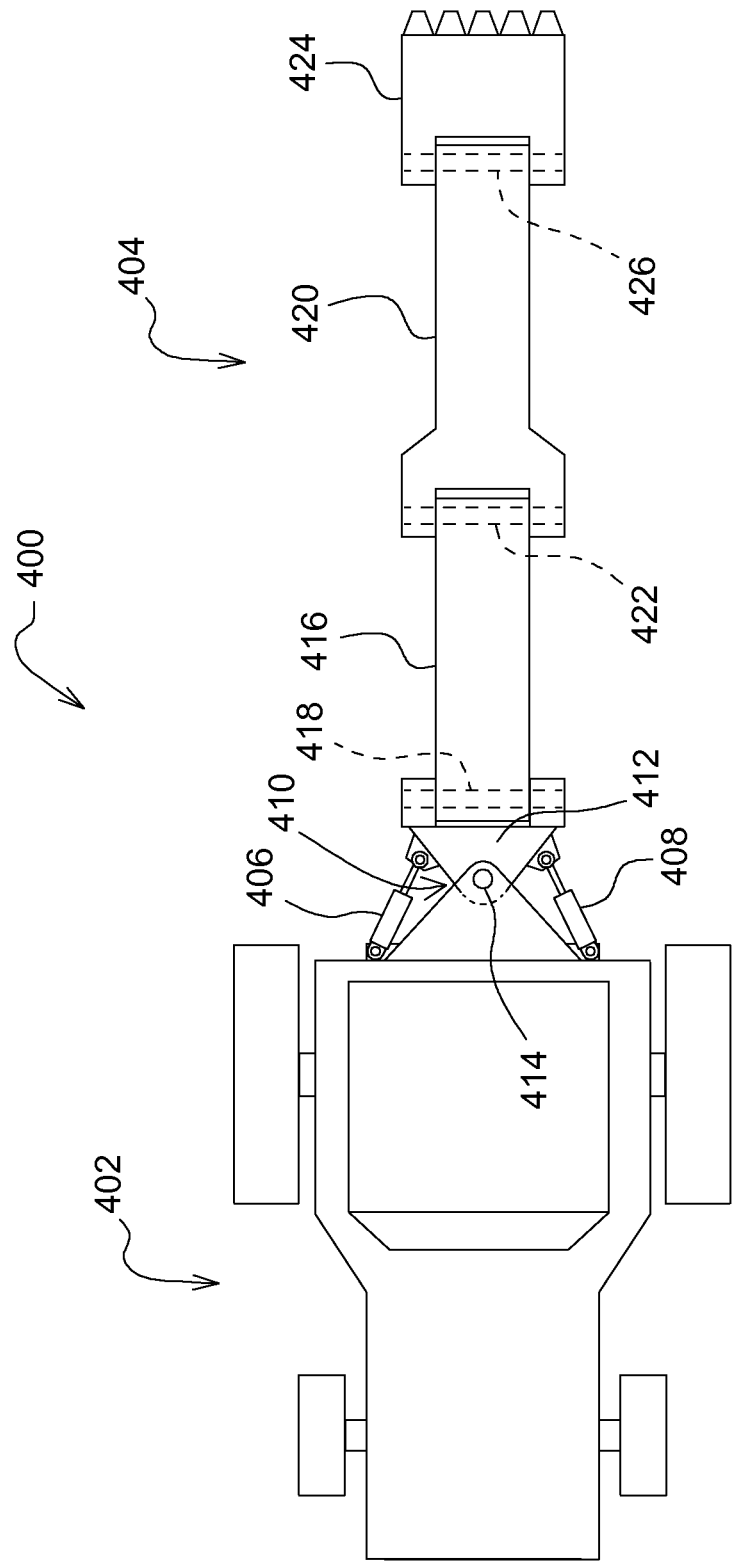
FIG. 4 is a plan view of a backhoe using opposed hydraulic cylinders to swing the boom.

Referring to FIG. 4, a backhoe 400 comprises a tractor 402 coupled to a backhoe attachment 404. A first hydraulic cylinder 406 and a second hydraulic cylinder 408 are coupled on either side of a pivot joint 410 to swing a backhoe boom base 412 to the left and to the right about a vertical pivot pin 414 with respect to the tractor 402 in the same manner as described above regarding the articulated truck 300. The backhoe attachment 404 includes a boom base 412, to which one end of a boom 416 is pivotally coupled about a horizontal pivot pin 418 to pivot up and down with respect to the boom base 412. A stick 420 is pivotally coupled at one end to the other end of the boom 416 about a horizontal pivot pin 422 to pivot up and down with respect to the boom 416. A bucket 424 is pivotally coupled at one end to the other end of the stick 420 to pivot up and down with respect to the stick 420 about a horizontal pivot pin 426.

In the arrangements of both FIG. 4 and FIG. 5, the relative pivoting movement between the frame members is limited. In other words, the cabin portion 302 cannot rotate freely with respect to the trailer portion 304, nor can the backhoe attachment 404 rotate freely with respect to the tractor 402. In both arrangements, the range of motion of one with respect to the other is limited. Typically, the range of relative movement (i.e. pivoting) is limited to 180° or less. Further relative movement is limited by the geometry of the hydraulic cylinders, mechanical stops, or other physical structures impeding the rotational movement. Since the range is limited in both directions, the relative movement has two limits: a first limit in one direction of pivoting, and a second limit in the other direction of pivoting.

FIG. 5A illustrates a system 500 for steering the articulated truck 300 and swinging the boom of the backhoe 400. The system 500 comprises an operator input device 502 which the operator manipulates to indicate his steering commands and communicate those commands to an ECU 504. In response to the steering commands, the ECU 504 controls a hydraulic valve 506 which selectively directs the flow of hydraulic fluid to a first hydraulic cylinder 508 and to the second hydraulic cylinder 510. The hydraulic valve 506 is controlled by the ECU 504 to selectively send hydraulic fluid to, and receive hydraulic fluid from, a first throttled cylinder end port 512 in the first hydraulic cylinder 508 and a second throttled cylinder end port 514 in the second hydraulic cylinder 510.

Ports on the first hydraulic cylinder 508 and ports on the second hydraulic cylinder 510 are directly coupled by a first hydraulic line 516 and a second hydraulic line 518. The first hydraulic line 516 couples a non-throttled (or unrestricted) cylinder end port 520 of the first hydraulic cylinder 508 to a non-throttled (or unrestricted) rod end port 522 of the second hydraulic cylinder 510. The second hydraulic line 518 couples a non-throttled (or unrestricted) cylinder end port 524 of the second hydraulic cylinder 510 to a non-throttled (or unrestricted) rod end port 526 of the first hydraulic cylinder 508.

The first hydraulic cylinder 508 and the second hydraulic cylinder 510 have the same construction and function the same as the hydraulic cylinder 100 of FIG. 1. The system shown in FIG. 5A can be used on the articulated truck 300 of FIG. 3 and on the backhoe 400 of FIG. 4.

When the system of FIG. 5A is used on the articulated truck 300 of FIG. 3, the first hydraulic cylinder 508 is equivalent to the first hydraulic cylinder 314, and the second hydraulic cylinder 510 is equivalent to the second hydraulic cylinder 316.

When the system of FIG. 5A is used on the backhoe 400 of FIG. 4, the first hydraulic cylinder 508 is equivalent to the first hydraulic cylinder 406, and the second hydraulic cylinder 510 is equivalent to the second hydraulic cylinder 408.

The system of FIG. 5A operates as follows. When the operator signals swinging/steering to the left, the ECU 504 moves the hydraulic valve toward valve position "A". This causes hydraulic fluid under pressure from hydraulic pressure source 528 to fill the throttled cylinder end port 514 and the cylinder end of the second hydraulic cylinder 510. The hydraulic fluid entering the cylinder end of the second hydraulic cylinder 510 is also communicated through the cylinder end and out the cylinder end port 524 of the second hydraulic cylinder 510 through the second hydraulic line 518 and into the rod end port 526 of the first hydraulic cylinder 508.

This causes the first hydraulic cylinder 508 to retract, and the second hydraulic cylinder 510 to extend.

At the same time, hydraulic fluid in the rod end of the second hydraulic cylinder 510 passes through the rod end port 522, through the first hydraulic conduit 516, and into the cylinder end port 520 of the first hydraulic cylinder 508. It is received in the cylinder end of the first hydraulic cylinder 508, and blows out of the throttled cylinder end port 512 of the first hydraulic cylinder 508. It then passes through the hydraulic line connecting the first hydraulic cylinder 508 to the valve 506, passes through the valve, and returns to the hydraulic fluid reservoir 530.

Eventually, the first hydraulic cylinder 508 retracts far enough that its internal damper 112 (see FIG. 1) restricts hydraulic fluid flow through the throttled cylinder end port 512. This causes the hydraulic fluid pressure in the cylinder end of the first hydraulic cylinder 508 to increase substantially as a leftward movement of the cabin portion 302 (see FIG. 3) or the leftward movement of the backhoe attachment 404 (see FIG. 4) is damped.

The increased pressure in the cylinder end of the first hydraulic cylinder 508 is communicated through the first hydraulic line 516 to the rod end of the second hydraulic cylinder 510. Thus, the internal damper 112 of the first hydraulic cylinder 508 simultaneously generates the same high pressure in the cylinder end of the first hydraulic cylinder 508 and the rod end of the second hydraulic cylinder 510. This common high pressure causes both cylinders to simultaneously apply equal decelerating forces to the vehicles to which they are attached.

Since the cylinders 508, 510 are identical, and since their connections to the valve 506 and their interconnections are symmetric, the operation described above regarding left turns is equally true regarding right turns. When the operator steers to the right, the internal damper in the second hydraulic cylinder 510 will operate and the high pressure will be communicated between the cylinders 508, 510 through the second hydraulic line 518.

FIG. 5B illustrates an alternative cylinder arrangement to the cylinder arrangement shown in FIG. 5A. In the FIG. 5B arrangement, hydraulic cylinder 200 (FIG. 5B) has been substituted for hydraulic cylinder 100 (FIG. 5A). The FIG. 5B arrangement functions the same as the arrangement of FIG. 5A.

The arrangement of FIG. 5B (shown in the FIG. 5B dashed box) is substituted for the arrangement of FIG. 5A (shown in the FIG. 5A dashed box).

The system of FIG. 5B operates as follows. When the operator signals swinging/steering to the right, the ECU 504 moves the hydraulic valve toward valve position "A". This causes hydraulic fluid under pressure from hydraulic pressure source 528 to fill the throttled rod end port 514' and the rod end of the second hydraulic cylinder 510'. The hydraulic fluid entering the rod end of the second hydraulic cylinder 510' is also communicated through the rod end and out the non-throttled (or unrestricted) cylinder end port 524' of the second hydraulic cylinder 510' through the second hydraulic line 518' and into the non-throttled (or unrestricted) cylinder end port 526' of the first hydraulic cylinder 508'.

This causes the first hydraulic cylinder 508' to extend, and the second hydraulic cylinder 510' to retract.

At the same time, hydraulic fluid in the cylinder end of the second hydraulic cylinder 510' passes through the non-throttled (or unrestricted) cylinder end port 522', through the first hydraulic conduit 516', and into the non-throttled (or unrestricted) rod end port 520' of the first hydraulic cylinder 508'. It is received in the rod end of the first hydraulic cylinder 508', and flows out of the throttled rod end port 512' of the first hydraulic cylinder 508'. It then passes through the hydraulic line connecting the first hydraulic cylinder 508' to the valve 506, passes through the valve, and returns to the hydraulic fluid reservoir 530.

Eventually, the first hydraulic cylinder 508' retracts far enough that its internal damper 212 (see FIG. 2) restricts hydraulic fluid flow through the throttled rod end port 512'. This causes the hydraulic fluid pressure in the rod end of the first hydraulic cylinder 508' to increase substantially as a rightward movement of the cabin portion 302 (see FIG. 3) or the leftward movement of the backhoe attachment 404 (see FIG. 4) is damped.

The increased pressure in the rod end of the first hydraulic cylinder 508' is communicated through the first hydraulic line 516' to the cylinder end of the second hydraulic cylinder 510'. Thus, the internal damper 212 of the first hydraulic cylinder 508' simultaneously generates the same high pressure in the cylinder end of the first hydraulic cylinder 508' and the rod end of the second hydraulic cylinder 510'. This common high pressure causes both cylinders to simultaneously apply equal decelerating forces to the vehicles to which they are attached.

Since the cylinders 508', 510' are identical, and since their connections to the valve 506 and their interconnections are symmetric, the operation described above regarding right turns is equally true regarding left turns. For example, when the operator steers to the left, the internal damper 212 in the second hydraulic cylinder 510' will eventually operate and the high pressure generated by the internal damper 212 will be communicated between the cylinders 508', 510' through the second hydraulic line 518'.

Considering the embodiments of FIG. 5A and of FIG. 5B together, both arrangements use an internal damper in one hydraulic cylinder to throttle hydraulic fluid flow leaving that cylinder and returning to valve 506 as the steering/swinging reaches a limit defined by the dimensions and location of the internal damper.

As the hydraulic fluid flow is throttled, the increase in hydraulic fluid pressure is communicated through a cross conduit coupled between the rod end of one cylinder and the cylinder end of the other. The throttling prevents hydraulic fluid from flowing through this cross conduit, and thus (given that the two hydraulic cylinders have equal dimensions) generates an equal damping force in both cylinders that resists further swinging/steering. In both the embodiments of FIG. 5A in FIG. 5B, the throttling reduces the flow of hydraulic fluid out of both cylinders.

The claims define the invention, which is not limited to the specific embodiment or embodiments described herein. Obvious variations of the specific embodiments shown herein will be apparent to one skilled in the art.

I claim:

1. A work vehicle with a cylinder cushioning arrangement, comprising:
a first vehicle frame member;
a second vehicle frame member pivotally coupled to the first vehicle frame member at a pivot joint wherein the pivot joint defines an axis of pivot;
a first hydraulic cylinder coupled to and between the first vehicle frame member and the second vehicle frame member, the first hydraulic cylinder having a unrestricted cylinder end port, an unrestricted rod end port, and either a restricted rod end port or a restricted cylinder end port;
a second hydraulic cylinder coupled to and between the first vehicle frame member and the second vehicle frame member, the second hydraulic cylinder having an unrestricted cylinder end port, and unrestricted rod end port and either a restricted rod end port or a restricted cylinder end port;
a first conduit hydraulically coupling the unrestricted rod end port of the first hydraulic cylinder to the unrestricted cylinder end port of the second hydraulic cylinder; and
a second conduit hydraulically coupling the unrestricted cylinder end port of the first hydraulic cylinder to the unrestricted rod end port of the second hydraulic cylinder.

2. The work vehicle of claim 1, further comprising a hydraulic valve coupled to the restricted rod end port or the restricted cylinder end port of the first hydraulic cylinder, and also coupled to the restricted rod end port or the restricted cylinder end port of the second hydraulic cylinder, wherein the hydraulic valve is controllable to introduce hydraulic fluid into the first hydraulic cylinder and the second hydraulic cylinder, and to remove hydraulic fluid from the first hydraulic cylinder and the second hydraulic cylinder, to move the first hydraulic cylinder and the second hydraulic cylinder, and to thereby pivot the first vehicle frame member with respect to the second vehicle frame member.

3. The work vehicle of claim 2, wherein the first hydraulic cylinder further comprises a first internal damper that restricts flow through the restricted rod end port or the restricted cylinder end port of the first hydraulic cylinder; and wherein the second hydraulic cylinder further comprises a second internal damper that restricts flow through the restricted rod end port or the restricted cylinder end port of the second hydraulic cylinder.

4. The work vehicle of claim 3, wherein the first internal damper and the second internal damper are configured to respectively restrict flow of hydraulic fluid exiting the first hydraulic cylinder and the second hydraulic cylinder.

5. The work vehicle of claim 4, wherein the first internal damper and the second internal damper are configured to not restrict flow of hydraulic fluid entering the first hydraulic cylinder and the second hydraulic cylinder, respectively.

6. The work vehicle of claim 3, wherein the first internal damper and the second internal damper are configured to limit an outflow of hydraulic fluid from the first hydraulic cylinder and the second hydraulic cylinder only near a limit of travel of the first hydraulic cylinder and the second hydraulic cylinder to thereby collectively cushion the first hydraulic cylinder and the second hydraulic cylinder at their limits of travel.

7. The work vehicle of claim 6, wherein the first internal damper cushions both the first hydraulic cylinder and the second hydraulic cylinder at a first limit of pivoting movement of the first vehicle frame member with respect to the second vehicle frame member in a first relative pivoting direction, and wherein the second internal damper cushions both the first hydraulic cylinder and the second hydraulic cylinder at a second limit of pivoting movement of the first vehicle frame member with respect to the second vehicle frame member in a second relative pivoting direction, wherein the second relative pivoting direction is a direction opposite to the first relative pivoting direction.

8. The work vehicle of claim 7, wherein the first internal damper of the first hydraulic cylinder cushions the second hydraulic cylinder by restricting hydraulic fluid flow out of one of the unrestricted cylinder end port, and the unrestricted rod end port.

9. The work vehicle of claim 3, wherein the first internal damper and the second internal damper comprise a rod extending from a piston and an aperture formed in a cylinder head of the first hydraulic cylinder, wherein the rod is received inside the aperture to restrict hydraulic fluid flow out of the restricted cylinder end port of the first hydraulic cylinder.

10. The work vehicle of claim 3, wherein the first internal damper of the first hydraulic cylinder comprises a tapered ring extending about a piston rod of the first hydraulic cylinder and an annular aperture formed in a rod end of the first hydraulic cylinder.

11. The work vehicle of claim 10 wherein the second internal damper of the second hydraulic cylinder comprises a tapered ring extending about a piston rod of the second hydraulic cylinder and an annular aperture formed in a rod end of the second hydraulic cylinder.

* * * * *